Nov. 18, 1941.                W. C. SCHULER                2,263,053
                    MULTIPLE WIPER OPERATING MECHANISM
                       Filed July 17, 1940        2 Sheets-Sheet 2
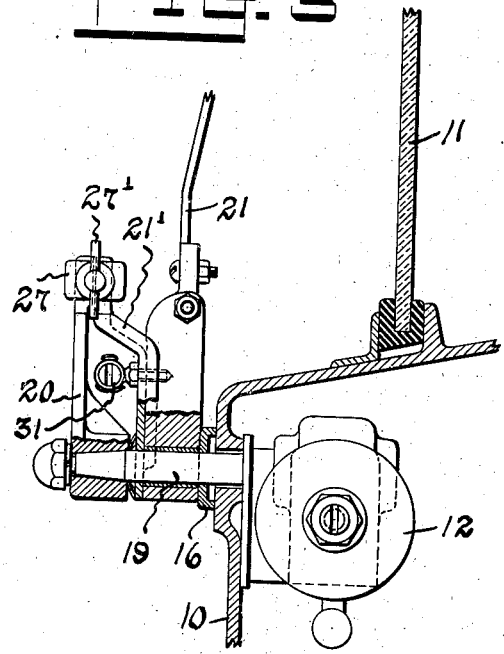
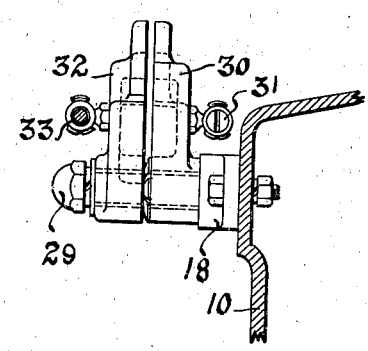
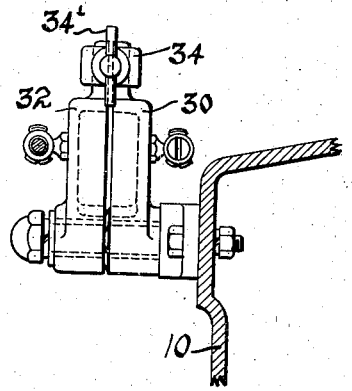
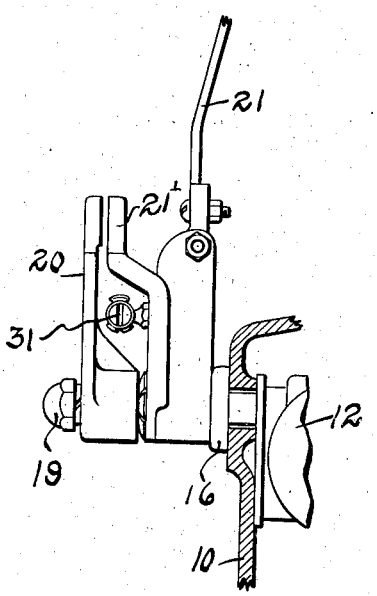
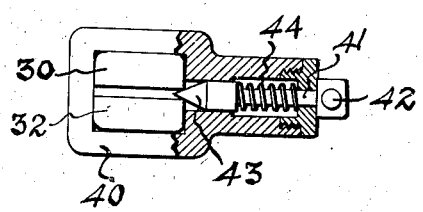
INVENTOR.
William Carl Schuler
BY
Danby & Danby
Atts Patented Nov. 18, 1941

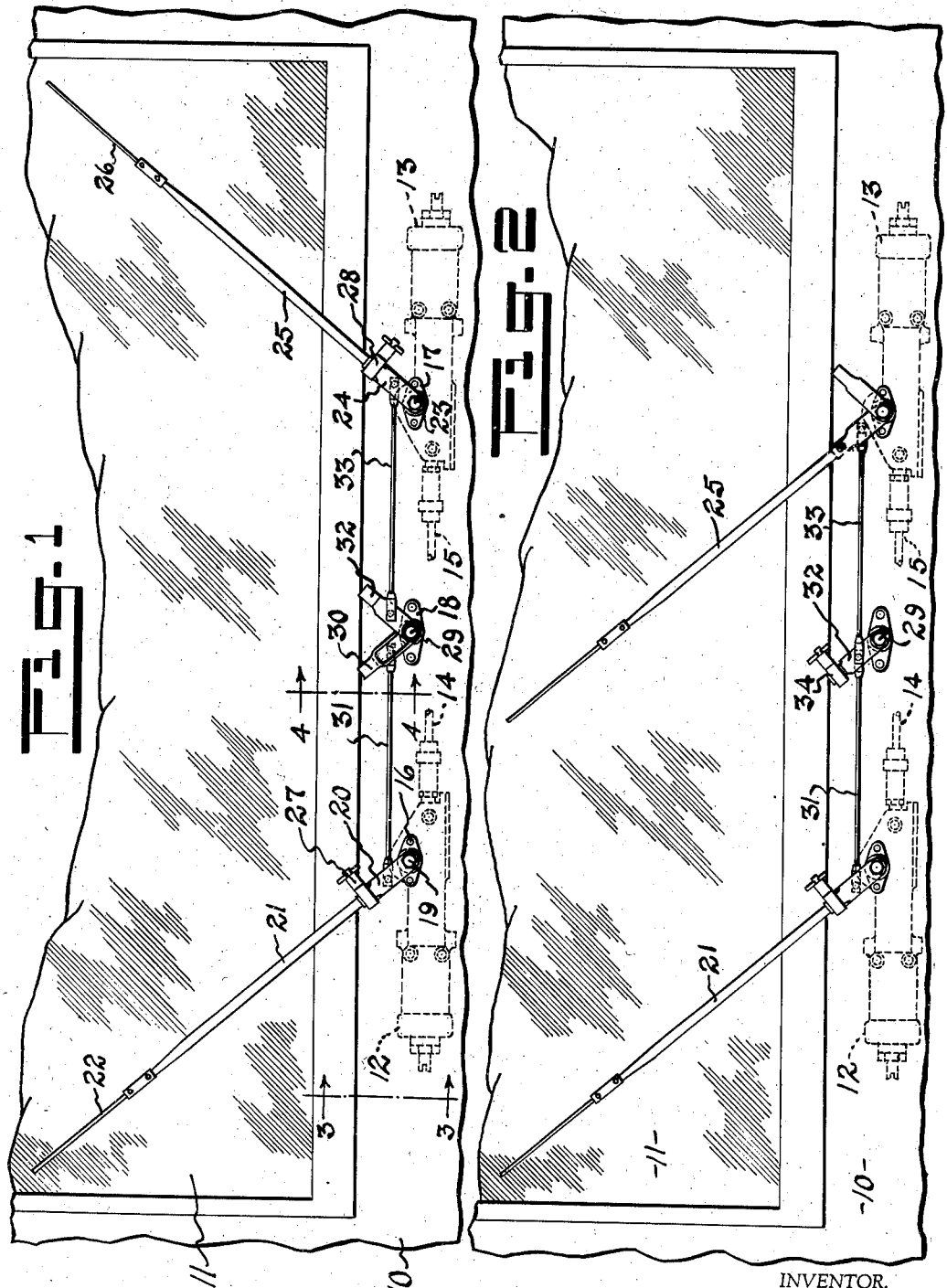

2,263,053

UNITED STATES PATENT OFFICE 2,263,053

MULTIPLE WIPER OPERATING MECHANISM

William Carl Schuler, Rahway, N. J., assignor to National Pneumatic Company, New York, N. Y., a corporation of West Virginia Application July 17, 1940, Serial No. 345,875

3 Claims. (Cl. 15—255)

This invention is concerned with improvements in windshield wipers and particularly of the type frequently employed on transportation vehicles, such as motor buses.

The general object of this invention is to provide a pair of independently motor-operated windshield wipers so constructed and arranged that in the event one of the motors becomes inoperative the two wipers may be easily and quickly coupled together and operated in unison by the operative motor of the pair.

The other objects of this invention will be apparent from the following description when taken in connection with the attached drawings.

This invention resides substantially in the combination, construction, arrangement and relative location of parts, all in accordance with this disclosure.

In the accompanying drawings,

Figure 1 is a front elevational view of a portion of a vehicle to which the invention has been applied showing the apparatus conditioned for independent operation of the wipers;

Figure 2 is a similar view showing the apparatus conditioned for simultaneous operation of the wipers by one of the motors;

Figure 3 is a cross-sectional view taken on the line 3—3 of Figure 1;

Figure 4 is a cross-sectional view taken on the line 4—4 of Figure 1 with some parts broken away and the clamp removed;

Figure 5 is a view similar to Figure 3 with the clamp removed;

Figure 6 is a view similar to Figure 4 with the clamp applied; and

Figure 7 is an elevational view, partly in section, of a modified form of clamp.

It is common practice to employ more than one windshield wiper on the front of passenger buses because of the relatively wide expanse of the windshield on such vehicles. In one form of such apparatus a pair of windshield wipers are employed, each independently operated by its own motor. It occasionally happens that one of the operating motors fails to operate, for one reason or another, which condition is quite likely to occur during the operation of the bus. Such a condition frequently results on some portion of the bus route where repairs cannot be readily made, with the result that the vehicle must continue on its route with only one wiper operating. This is particularly bad if the wiper in front of the vehicle driver should become inoperative. In accordance with the arrangement of this invention, provision is made whereby in the event that either of the wiper motors becomes inoperative the mechanism can be so coupled that both wipers will be operated by the remaining motor, which motor will operate both of the wipers simultaneously until the defective motor can be repaired.

As illustrated in Figure 1, a portion of the front of a bus is shown at 10, in which is mounted the transparent windshield 11. Mounted below the window are a pair of wiper operating motors 12 and 13, which are illustrated as of the pneumatic type, respectively provided with the pressure fluid supply connections 14 and 15. The operating shafts 19 and 23 of the motors 12 and 13, respectively, project through plates 16 and 17 secured on the front of the vehicle, as is shown more clearly in Figures 3 and 5.

Mounted on the shaft 19 for oscillation thereon is a wiper arm 21 on which the wiper blade 22 is secured so as to slide on the surface of the windshield 11. A short lever 20 is secured on the shaft 19 in front of the adjacent end of the lever 21. The short lever 20 oscillates with the shaft 19. The lever 21 has a projection 21' positioned so as to be aligned directly in back of the lever 20. When the levers 20 and 21' are aligned they may be clamped together for conjoint movement by means of a clamp 27, which is generally of the shape of the clamp shown in Figure 7, having a rectangular opening so as to fit over the ends of these levers. A threaded thumb-screw 27' is mounted on the clamp 27 so as to secure it on the levers. Thus when the shaft 19 is oscillated by the motor 12 the wiper arm is oscillated with it through its connection to the lever 20. Similarly mounted on the shaft 23 is a wiper arm 25, which may oscillate thereon and which is provided with a wiper blade 26 positioned to slide over the surface of the windshield 11. Secured on the shaft 23 for oscillation with it is a short lever 24, like the lever 20. The wiper arm 25 is provided with a projecting arm (not shown) just like the arm 21' of the wiper arm 21 (see Figure 3). Thus the wiper arm 25 may be coupled to the lever 24, as in the previous case, by means of a clamp 28. Thus when the shaft 23 oscillates the wiper arm 25 will oscillate.

Mounted on a plate 18 secured on the front 10 of the vehicle is a stud shaft 29 on which are pivotally mounted a pair of short levers 30 and 32, as shown clearly in Figures 1 and 4. The lever 30 is pivotally connected to the wiper arm 21 by means of a link 31 while the lever 32 is pivotally connected to the wiper arm 25 by a link 33. When desired, as will be explained later, the two levers 30 and 32 may be aligned and clamped together, as shown in Figure 2, by a clamp 34 and thumb-screw 34', which may, as will appear later, be either of the clamps 28 previously described.

In the normal operation of this apparatus levers 30 and 32 are not clamped together but the clamps 27 and 28 are in place. Thus when pressure fluid is supplied to the motors 12 and 13 through their respective connections 14 and 15 they will operate continuously to cause oscillation of the wiper arms. If it is assumed, however, that for some reason during a run of the vehicle the motor 13 should become inoperative, it is only necessary to remove clamp 28 so as to free the wiper arm 25 from the shaft 23 and apply the clamp 28 to the ends of the levers 30 and 32, as indicated in Figure 6 at 34, and lock it in place with thumb-screw 34'. In this case wiper arm 25 will be connected to the shaft 19 through the links 31 and 33 and the coupled arms 30 and 32. Thus the operative motor 12 is used to effect simultaneous operation of both wiper arms during the emergency period. It is, of course, apparent that should the motor 12 break down rather than the motor 13 it is only necessary to remove clamp 27 and apply it to the arms 30 and 32, in which event the motor 13 will operate both of the wiper arms.

The clamp shown in Figure 7 is similar to the clamps previously described but in this case the clamp screw is replaced by a spring-pressed plunger. Describing this clamp in detail, it is shown as consisting of a suitably shaped body member 40 having a rectangular opening suitably sized and shaped so that it can fit over the various lever ends, as for example the levers 30 and 32 as illustrated in Figure 7. Slidably mounted on the clamp body is a pin 41 having a finger piece 42 on its outer end and a conically shaped head 43 on the opposite end to fit between the levers 30 and 32 to wedge them in the clamp opening. A spring 44 is employed to move the conical head 43 to the position shown in Figure 3 whenever the finger piece is released. This clamp may be more quickly removed and applied but depends upon the strength of the spring for its action, whereas in the previous clamp the clamp screw threadedly engages the clamp body and can be jammed down as tight as desired.

From the above description it will be apparent to those skilled in the art that this invention is capable of adaptation for its intended use in other physical structures, and I do not, therefore, desire to be strictly limited to the disclosure as given for the purposes of illustration but rather to the scope of the claims granted me.

What I claim is:

1. A windshield wiper combination, including a pair of operating motors, a pair of wiper arms supported for oscillation, clutch means for selectively connecting said arms to said motors at will respectively so that the arms may be independently operated, either of said wiper arms being free of its motor when said means is released, and clutch means for connecting said wiper arms together, the aforesaid clutches being so arranged that the wiper arms may be selectively driven independently by their respective motors, or both arms may be driven by either motor.

2. In a windshield wiper apparatus, the combination including a pair of operating motors, each having a shaft, wiper arms respectively mounted on said shafts for oscillation thereon, clamp means for selectively connecting at will the respective wiper arms to their associated shafts whereby the arms are operated by their associated motors, and clamp means for connecting the wiper arms together, the aforesaid clamps being so arranged that the wiper arms may be selectively driven independently by their respective motors, or both arms may be driven by either motor.

3. A windshield wiper combination as described including a pair of independently mounted oscillatable wiper arms, a pair of drive motors, means for releasably connecting each of said wiper arms to its respective drive motor, a two-part linkage system including a pair of relatively movable members, the respective parts of the linkage system being connected to said motors respectively whereby either of said wiper arms may be disconnected from its motor and means to releasably lock said two-part linkage system together, whereby both wiper arms may be operated by either of said motors.

WILLIAM CARL SCHULER.